M. E. THOMAS.
MOWING MACHINE.
APPLICATION FILED SEPT. 12, 1910.
1,030,689.
Patented June 25, 1912.
2 SHEETS—SHEET 1.
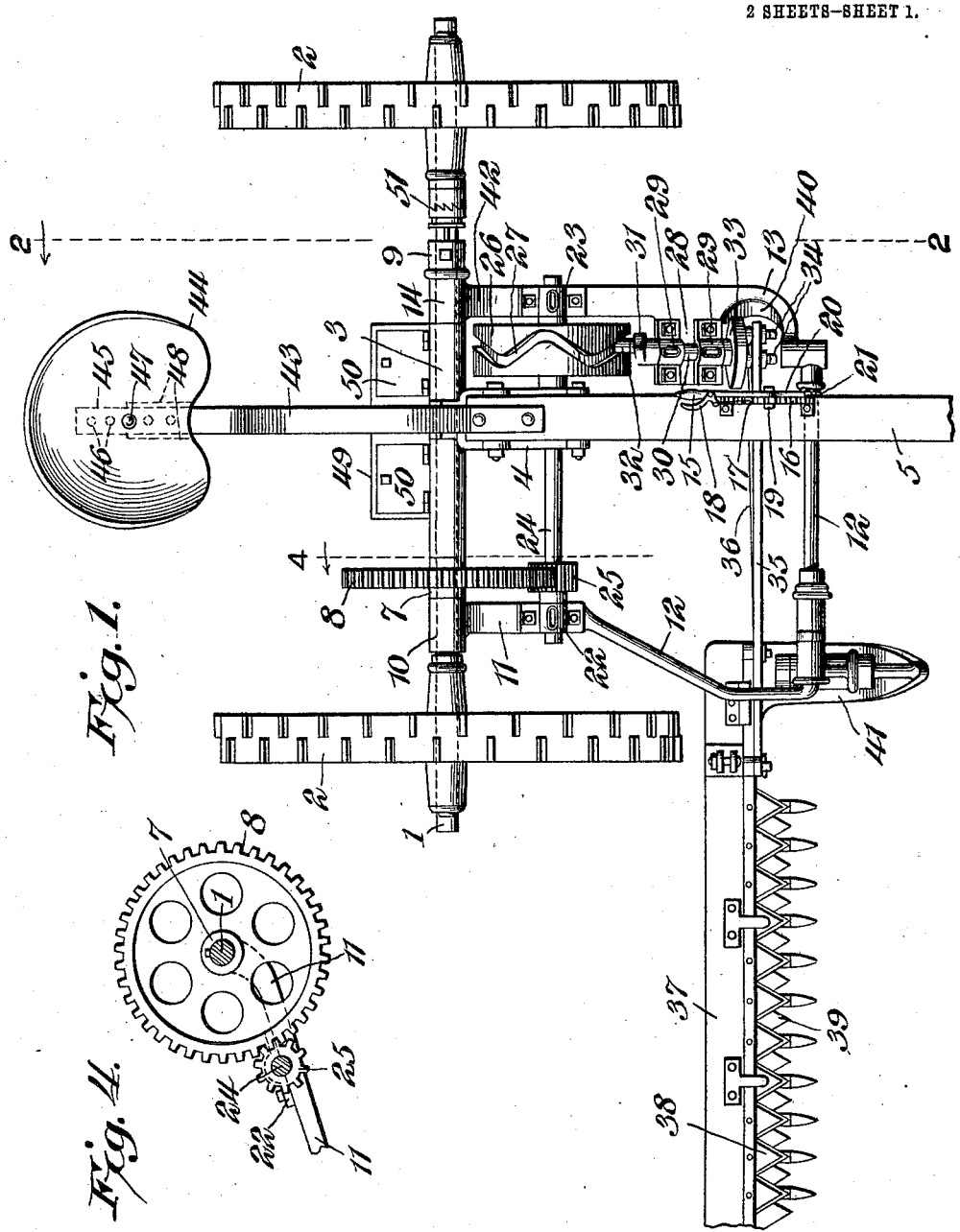
Martin E. Thomas, INVENTOR,
WITNESSES
Howard D. Orr.
F. T. Chapman.
BY
E. G. Siggers
ATTORNEY

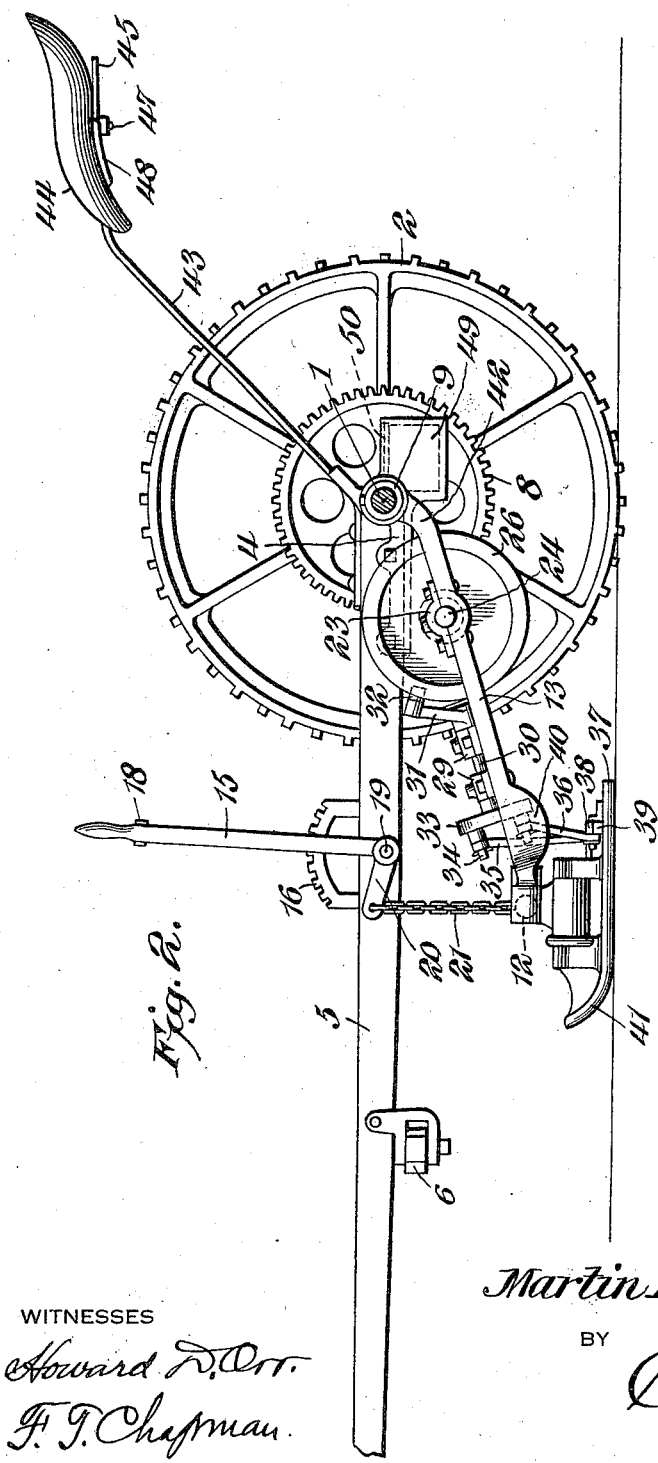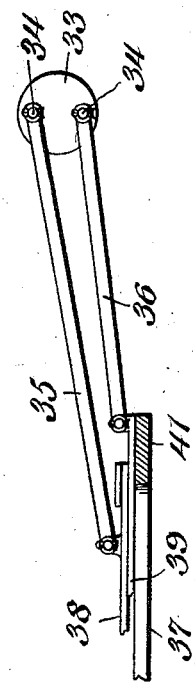

UNITED STATES PATENT OFFICE.

MARTIN E. THOMAS, OF BOWLING GREEN, KENTUCKY, ASSIGNOR OF ONE-HALF TO W. F. TOOPS & SON, OF BOWLING GREEN, KENTUCKY, AND ONE-FOURTH TO JOHN W. PERYMAN, OF SOUTH UNION, KENTUCKY.

MOWING-MACHINE.

1,030,689.  Specification of Letters Patent.  Patented June 25, 1912.

Application filed September 12, 1910. Serial No. 581,557.

*To all whom it may concern:*

Be it known that I, MARTIN E. THOMAS, a citizen of the United States, residing at Bowling Green, in the county of Warren and State of Kentucky, have invented a new and useful Mowing-Machine, of which the following is a specification.

This invention has reference to improvements in mowing machines, and its object is to provide a means whereby the driving pitmen for the cutter bars may be brought into a position approaching alinement with the length of the cutter bars irrespective of the position of the pole or tongue due to the use of horses of different heights, and, furthermore, it is the object of the invention to provide means whereby the weight of the driving mechanism and of the person driving may be so disposed that such weights are not brought to bear upon the draft animals to any material extent.

In accordance with the present invention the driving mechanism is so mounted on the axle of the mower that it may be raised or lowered with reference to the tongue or pole to which the draft animals are attached that the pitman and actuating means therefor may be maintained in the same relation to the cutter bars in a position close to actual alinement therewith, whether the draft animals be large animals with a consequent elevation of the front end of the tongue, or the draft animals be small animals with a consequent lowering of the front end of the tongue. By an adjustable mounting of the seat for the driver, this seat may be arranged closer to or farther from the axle and is made fast to the tongue, so that the weight of the driver on one side of the axle will tend to counter-balance the weight of the tongue projecting from the other side of the axle.

The invention will be best understood from a consideration of the following detailed description taken in connection with the accompanying drawings forming a part of this specification, with the understanding, however, that the invention in its practical embodiments is not limited to the exact arrangement or construction of parts shown in the drawings and hereinafter described, so long as such practical embodiments shall have incorporated therein the salient features of the present invention.

In the drawings:—Figure 1 is a plan view of a mower equipped with the present invention. Fig. 2 is a section on the line 2—2 of Fig. 1. Fig. 3 is a detailed view showing the front side of the cutter bar frame, and the driving pitmen with associated parts, other parts of the structure being omitted. Fig. 4 is a section on the line 4—4 of Fig. 1 omitting distant parts.

Referring to the drawings, there is shown an axle 1 carrying wheels 2—2, such as are commonly employed in machines of this character, and consequently no specific description is needed of these features.

Intermediate of the axle there is mounted a sleeve 3 on which is formed, or to which is secured a yoke having spaced legs 4 receiving between them a tongue or pole 5, such as is commonly employed in mowing machines. This pole is provided with draft appliances 6, but as these parts do not enter into the present invention no description of them is needed.

At one end of the sleeve the axle 1 has secured thereto the hub 7 of a gear wheel 8, while beyond the other end of the sleeve 3 in spaced relation thereto there is secured to the axle 1 a collar 9. Between the hub 7 and the hub of the wheel 2 at the corresponding end of the axle there is loosely mounted on the axle a collar 10, from which there projects an arm 11 which may be flat for a portion of its length, being there in substantial parallelism with the pole, though capable of moving up and down upon the axle as an axis. Beyond the flattened portion of the arm 11, it may be continued, and as shown at 12, is continued in the form of a substantially round member bent to recede from the tongue 5 and finally is bent in a direction transverse to the tongue 5, being carried thereunder and ultimately joined to the forward end of an arm 13 on the other side of the tongue 5 from the arm 11 and in parallel relation to the arm 11, and this arm 13 terminates at the rear end in a sleeve 14 mounted loosely on the axle 1 between the sleeve 3 and collar 9. The parts 11, 12 and 13 constitute a frame mounted to turn on the axle 1 so that the front end of this frame may be elevated or lowered at will irrespective of the tongue 5, and for this purpose there is mounted on the tongue 5 a hand lever 15 in operative relation to a rack segment 16 on the tongue, the lever being provided with the usual thumb latch 17 for engaging the rack 16, the hand end of the lever 15 having mounted thereon the usual thumb lever 18 connected to the latch 17 as is customary. The lever 15 is pivotally supported on the tongue 5 by means of a pivot pin 19, and this lever is provided with a short arm 20 projecting from the pivot point at an angle to the main arm of the lever. This short arm 20 at its outer end is connected by a chain 21 or other suitable flexible means with an appropriate part of the frame member 12 where it passes beneath the tongue 5, so that by appropriate manipulation of the lever 15 the outer end of the frame 11, 12, 13 may be raised or lowered with relation to the tongue to any desired extent, or the relation of the outer end of the frame to the ground may by this means be maintained constant, or substantially constant, whatever the elevation of the outer end of the tongue be due to the height of the draft animals. If the draft animals be large the outer end of the tongue will be raised comparatively high. If the draft animals be small, the outer end of the tongue will be correspondingly lowered. In either instance the relation of the frame 11, 12, 13 with reference to the ground may be established by a proper manipulation of the lever 15. Furthermore, the front end of this frame may be raised as high as needed by the manipulation of the lever 15 when the mower is being moved along a road, or under any other circumstances where the mower is not in operation.

The arm 11 carries a journal bearing 22 and the arm 13 carries a like journal bearing 23 in axial alinement with the bearing 22, and mounted in these bearings are the ends of a counter-shaft 24. Near the bearing 22 the shaft 24 carries a pinion 25 in mesh with the gear wheel 8, while near the bearing 23 the shaft carries a groove wheel 26 in which is formed a sinuous groove 27, or the wheel 26 may be replaced by any of the many forms of like wheels for the purpose.

The frame member 13 is formed with an offset 28 carrying journal bearings 29 for a shaft 30 so disposed that its longitudinal axis is substantially perpendicular to the axis of the shaft 24, a slight variation from perpendicular relation of these two shafts not being material. The shaft 30 adjacent to the grooved wheel 26 carries a rock arm 31 provided at its free end with a roller 32 engaging in the groove 27. At the other end of the shaft 30 there is made fast thereto a disk 33 carrying diametrically disposed wrist pins 34 on opposite sides of the center of the disk and on these wrist pins are mounted the corresponding ends of two pitmen 35, 36, respectively.

The mowing machine is equipped with the customary finger bar 37 and this bar carries two cutter blades 38, 39, designed to be reciprocated one on the other in the operation of the machine. One of these cutter blades, say the blade 38, is connected at one end to the pitman 35, while the blade 39 is connected to the pitman 36, the arrangement being such that when the shaft 30 is rocked by the action of the sinuous groove 27 on the rock arm 31 through the roller 32, the disk 32 participates in this rocking movement, thus imparting to the pitmen 35, 36 corresponding reciprocatory movements, and the blades 38 and 39 are caused to slide one over the other in a manner to shear any grass or grain or other stalks entering between the teeth of the blades.

The arm 13 adjacent to the disk 33 is formed with a guard 40 which may follow the usual practice, and the end of the cutter frame 37 adjacent to the tongue 5 is formed with a shoe 41 which may, also, follow the usual practice.

The arms 11 and 13 of the frame carrying the cutter actuating mechanism are declined from the axle toward the ground when in operative position, but those portions of the arms adjacent the axle are bent so that the main portion of the frame carrying the cutter actuating mechanism is brought more nearly into parallelism with the ground than would be the case were the frame straight from the axle to the forward end. That is, the portion of the frame from the forward end of the bent portion to the forward end of the frame is lower when in operation than the same portion of an unbent frame would be. The result is that the shaft 24 and groove wheel 26 are brought closer to the ground and also relatively nearer to a line dropped from the axle perpendicular to the ground, thus permitting a larger drive gear without shortening the rock shaft 13 than would be the case if the bent portion 42 were omitted, wherefore a higher speed of reciprocation of the knives is brought about than has heretofore been the case and, moreover, the wrist pin disk 33 and shaft 30 are brought more nearly to the operating plane of the knives, thus correspondingly facilitating the operation of the knives and reducing friction. Since the frame carrying the cutter actuating mechanism is mounted to turn about the longitudinal axis of the axle 1, and since the gear wheel 8 is mounted on this axle, the adjustment of the frame carrying the cutter mechanism will not affect the relation of the pinion 25 to the gear wheel 8 at any time, these two members remaining in mesh irrespective of any adjustment of the frame.

Fast to the rear end of the tongue 5 is a spring post 43 which may be similar to the spring posts or standards commonly employed in connection with mowing machines, and to the upper rear end of this post there is secured to a seat 44, such as is commonly employed in machines of this character. However, the post has a seat carrying portion 45 more extended than usual, and in this portion 45 there is formed a longitudinal series of perforations 46, any one of which is adapted to receive a bolt 47 designed to hold the seat 44 on the end 45 of the post or standard 43 at any one of a number of different distances from the axle 1, the seat 44 being provided with spaced flanges 48 on its lower side in straddling relation to the end 45 of the post 43, these flanges co-acting with the bolt 47 to hold the seat in firm relation to the post.

The sleeve 3 may have formed thereon a foot rest 49 on the side remote from the tongue receptacle 4, and this foot rest may be so shaped as to be utilized as a tool box, suitable covers 50 being attached thereto. The foot rest 49 is employed when the seat 44 is toward its rearmost position, while the sleeve 3 may be utilized for the same purpose when the seat is moved forward. By means of the adjustment afforded for the seat it may be moved closer to or farther from the axle in accordance with the weight of the operator to counter-balance to a greater or less extent the tongue 5 so that the draft animals are relieved of the weight of the tongue to a commensurate extent.

The axle may carry near one of the wheels 2 a clutch 51, whereby the wheel, which may constitute the drive wheel of the mower, may be coupled to, or uncoupled from the axle at will, but this being a common feature of mowing machines no further description thereof and no showing or description of the manner of operating the clutch is deemed necessary.

When the machine is in operation, the clutch 51 is, of course, active to couple the drive wheel to the axle. The frame made up of the members 11, 12, 13 has the front end lowered to the greatest extent, so that the pitmen 35 and 36 are brought into close approach to alinement with the cutter blades 38, 39, and consequently are, when active, in the most efficient relation to these blades and to the wrist pin disk 33. It is immaterial how much the frame carrying the driving mechanism for the cutter blades be raised or lowered, the relation of the parts of the driving mechanism one to the other remains constant, except, of course, the relation of the pitmen to the cutter blades, the angle becoming greater as the frame is raised, but as this frame is only raised when the mower is inactive so far as the cutting operation is concerned, the greater angular relation of the pitmen to the cutters is immaterial.

While the invention has been described with reference to a double blade mowing machine, it will be understood that it is equally applicable to a single blade machine.

It will be understood that wherever desirable anti-friction bearings may be employed between relatively movable surfaces.

What is claimed is:—

1. In a mowing machine provided with supporting wheels and an axle, a frame carried by the axle and adjacent the latter bent toward the ground to there constitute a drop frame, the remainder of the frame being in operative position declined from the bent portion toward the front of the machine, a gear wheel mounted on the axle, a countershaft mounted on the frame and provided with a pinion meshing with the gear wheel at a point lower than the level of the axle, a cam groove wheel carried by the countershaft, a rock shaft carried by the frame and provided at one end with a rock arm engaging the cam wheel and provided with a wrist pin disk at the end remote from the cam wheel, double reciprocatory cutters for the machine, and pitmen extending from the wrist pin disk to the respective cutters.

2. In a mowing machine provided with supporting wheels and an axle, a pole carried by and projecting from the axle, a frame carried by the axle and adjacent the latter bent toward the ground to there constitute a drop frame and from the bent portion declining when in operative position toward the front of the machine, a cam drive wheel for the cutters of the machine mounted in the frame in front of the drop portion and having its axis of rotation in front of and at a lower level than the axle of the machine, oppositely movable reciprocating cutters, a rock shaft carried by the frame and provided at one end with a rock arm engaging the cam wheel and at the other end with a wrist pin disk having wrist pins on opposite sides of the axis of the shaft, pitmen one for each wrist pin extending to the respective cutters, gear connections between the axle and the cam wheel, and adjustable supporting means carried by the pole and connected to the front end of the frame.

In testimony, that I claim the foregoing as my own, I have hereto affixed my signature in the presence of two witnesses.

MARTIN E. THOMAS.

Witnesses:
 N. CLARK,
 W. DUNCAN.

Copies of this patent may be obtained for five cents each, by addressing the "Commissioner of Patents, Washington, D. C."